United States Patent [19]

Williams

[11] 4,209,427

[45] Jun. 24, 1980

[54] FLAME RETARDANT POLYCARBONATE COMPOSITION

[75] Inventor: Joseph B. Williams, Mt. Vernon, Ind.

[73] Assignee: General Electric Company, Pittsfield, Mass.

[21] Appl. No.: 865,321

[22] Filed: Dec. 28, 1977

[51] Int. Cl.² ............................................ C08L 69/00
[52] U.S. Cl. ................................................... 260/17.5
[58] Field of Search ...................... 260/17.5, 838, 849, 260/856, 842, 850

[56] References Cited

U.S. PATENT DOCUMENTS

| | | | |
|---|---|---|---|
| 2,950,266 | 8/1960 | Goldblum | 260/43 |
| 3,285,801 | 11/1966 | Sarjeant | 161/170 |
| 3,294,862 | 12/1966 | Prochaska | 260/829 |
| 3,395,033 | 7/1968 | Remer | 106/123 |
| 3,544,657 | 12/1970 | Schütze et al. | 60/850 |
| 3,651,174 | 3/1972 | Bialous | 260/873 |
| 3,673,278 | 6/1972 | Bialous | 260/873 |
| 3,915,911 | 10/1975 | Horiguchi | 260/17.5 |

OTHER PUBLICATIONS

Gable, "Polycarbonates with Low Flammability", Chemical Abstracts, 71, 31055s, (1969).

*Primary Examiner*—Earl A. Nielsen
*Attorney, Agent, or Firm*—Morgan, Finnegan, Pine, Foley & Lee

[57] ABSTRACT

A flame retardant polycarbonate composition comprising in admixture an aromatic carbonate polymer and a flame retardant additive chosen from the group comprising melamine-formaldehyde, phenol-formaldehyde, urea formaldehyde, lignin, lignosulfonates and mixtures thereof. The composition may additionally contain an organic halogen-containing flame retardant additive.

15 Claims, No Drawings

FLAME RETARDANT POLYCARBONATE COMPOSITION

This invention is directed to a flame retardant polycarbonate composition and, in particular, an aromatic polycarbonate containing in admixture therewith a flame retardant additive chosen from the group comprising melamine-formaldehyde, phenolformaldehyde, urea formaldehyde, lignin, lignosulfonates and mixtures thereof.

BACKGROUND OF THE INVENTION

With the increasing concern for safety, there is a positive move toward providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters' Laboratories, Inc. Subject 94. This document sets forth certain conditions by which materials are rated.

In the art, there are many known flame retardant additives which are employed by mixing with products to render such materials flame retardant. Such flame retardant additives have been known to be employed in amounts of 5 to 20 weight percent in order to provide flame retardant characteristics to those products which are combustible.

Aromatic carbonate polymer compounds by themselves do not exhibit adequate flame retardancy to meet Underwriters' Laboratories' Subject 94 ratings in certain thicknesses. As a result, many flame retardant additives have been disclosed in the art which render such polycarbonate compounds flame retardant. Many of the additives include metal salts of various aromatic sulfonic and sulfonesulfonic acids wherein the sulfur-containing moiety is attached to the aromatic ring.

SUMMARY OF THE INVENTION

It has now been surprisingly discovered that an aromatic polycarbonate can be made flame retardant by incorporating with said aromatic polycarbonate a minor amount of an additive chosen from the group comprising alkali metal lignosulfonates, alkaline earth metal lignosulfonates, a melamine-formaldehyde, phenol-formaldehyde, urea formaldehyde, lignin and mixtures thereof. The composition may additionally contain an organic halogen-containing flame retardant additive.

The preferred flame retardant additives are compounds selected from the group comprising alkali metal lignosulfonates, alkaline earth metal lignosulfonates and mixtures thereof.

While complete determination of the structure of lignosulfonates apparently has not been achieved, it is known that the basic lignin monomer unit is a substituted phenyl-propane. The lignosulfonates are metallic sulfonate salts prepared commercially from the lignin of sulfite pulp-mill liquors as known in the art. They are described as anionic polyelectrolytes whose molecular weights vary between 1,000 and 20,000.

Additionally, the lignosulfonates employed in this invention can be substituted with the substituent consisting of an electron withdrawing radical. Any of the electron withdrawing radicals can be employed in the practice of this invention, but, preferably the electron withdrawing radical or substituent is the halo-, nitro-, trihalomethyl or cyano withdrawing radical or mixtures thereof. The electron withdrawing phenomenon, or as it is also referred to as electronegativity, is defined in *Basic Principles of Organic Chemistry* by Roberts and Caserio, 1964 (pages 185-186), and *Physical Organic Chemistry* by Jack Hine, McGraw-Hill Book Company, Inc. 1962 (pages 5, 32 and 85-93). Briefly, the electron withdrawing phenomenon is where the radical has a strong affinity for a negative charge, namely electrons, but still remains covalent and does not form an ion. This is an extremely brief description of this phenomenon and is merely set forth here to describe the electron withdrawing effect. Reference should be made to the texts set forth above.

It is considered that a section of polymeric lignosulfonates can have the structure shown below:

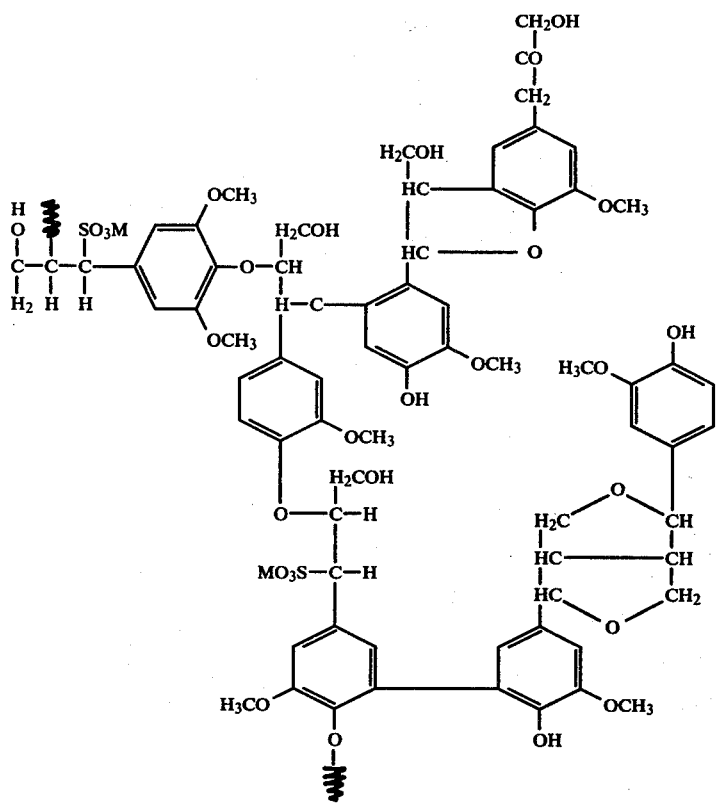

wherein M is an alkali or alkaline earth metal in the lignosulfonates employed in this invention.

The amount of the additive employed herein can vary, preferably, from about 0.1 to about 10 parts per hundred parts of aromatic polycarbonate. In one preferred embodiment, the amount of additive incorporated with the aromatic polycarbonate is 0.5 part per hundred parts aromatic polycarbonate. In a second preferred embodiment, the amount of additive is 1.0 part per hundred parts. The compositions of this invention can also contain other flame retardant additives, pigments, dyes, fillers, stabilizers and the like. Additionally, drip retarding agents which can include, but are not limited to, fluorinated polyolefins, fibrous glass, siloxanes and mixtures thereof can also be incorporated in the composition. The compositions can be processed by normal thermoplastic techniques as known in the art, such as injection molding, foam molding, extrusion, blow molding and the like.

DESCRIPTION OF A PREFERRED EMBODIMENT

The following examples are set forth to illustrate more clearly the principle and practice of this invention to those skilled in the art. Unless otherwise specified, where parts or percents are mentioned, they are parts or percents by weight.

EXAMPLE I

One hundred parts of an aromatic polycarbonate, prepared by reacting 2,2-bis(4-hydroxyphenyl)propane and carbonyl chloride in the presence of an acid acceptor and a molecular weight regulator and having an intrinsic viscosity of 0.57 dl/g in dioxane at 25° C., is mixed by dry tumbling with 0.5 part of a sodium lignosulfonate now produced by American Can Co. and named Maracell-C. Said Maracell-C has the following analysis:

pH (3% Solution): 7.0; Total Sulfur as S: 3.1%; Sulfate Sulfur as S: 0.1%; Na$_2$O: 5.7%; OCH$_3$: 12.5%; SO$_3$H: 3.0%; Moisture Content: 5–6%.

The resulting mixture is then fed to an extruder operating at about 265° C., and the extrudate is comminuted into pellets. These pellets are then injection molded to about 300° C. into test bars of about 5 inches by ⅛ inch by about ⅛ inch thick Five test bars are subject to the test procedure set forth in Underwriters' Laboratories, Inc. Bulletin UL-94, Burning Test for Classifying Materials. In accordance with this test procedure, materials so investigated are rated either V-0, V-1 or V-2 based on the results of 5 specimens. The criteria for each rating per UL-94 is briefly as follows:

"94 V-0": No single flaming combustion after removal of the igniting flame shall exceed 10 seconds and none of the specimens shall drip flaming particles which ignite absorbent surgical cotton placed 12" below the specimen. Total flame out time for all 5 specimens (10 ignitions) cannot exceed 50 seconds.

"94 V-1": No single flaming combustion after removal of the igniting flame shall exceed 30 seconds and none of the specimens shall drip flaming particles which ignite absorbent surgical cotton placed 12" below the specimen. Total flame out time for all 5 specimens (10 ignitions) cannot exceed 250 seconds.

"94 V-2": No single flaming combustion after removal of the igniting flame shall exceed 30 seconds. The specimens drip flaming particles which burn only briefly, some of which ignite absorbent surgical cotton placed 12" below the specimen. Total flame out time for all 5 specimens (10 ignitions) cannot exceed 250 seconds.

In addition, a test bar which continues to burn for more than 30 seconds after removal of the igniting flame is classified, not by UL-94, but by the standards of the instant invention, as "burns." Further, UL-94 requires that all test bars in each test group must meet the V type rating to achieve the particular classification. Otherwise, the 5 bars receive the rating of the worst single bar. For example, if one bar is classified as 94 V-2 and the other four are classified as 94 V-0, then the rating for all 5 bars is 94 V-2.

Control test bars of 1/16 inch thickness are made as described above except without the flame retardant additive. Results of the control test bars are as follows:
  Total flame out time (sec): >300
  Range of flame out (sec): 30–35
  No. of burning drips per test bar: 2
  Rating: Burns In contrast, results of the test bars incorporating 0.5 parts flame retardant additive per hundred parts polycarbonate are as follows:
  Total flame out time (sec): 66.4
  Range of flame out time (sec): 4.3–10.3
  No. of burning drips per test bar: 1
  Rating: 94 V-2

EXAMPLE II

In the same manner as in Example I, a composition of 100 parts of the aromatic polycarbonate and 1 part Maracell-C is made into 1/16 inch thick test bars. Flame tests on these bars are as follows:
  Total flame out time (sec): 58.2
  Range of flame out time (sec): 1.0–9.7
  No. of burning drips per test bar: 1
  Rating: 94 V-2

EXAMPLE III

In the same manner as in Example I, a composition of 100 parts of the aromatic polycarbonate and 0.5 part of a sodium lignosulfonate, now produced by American Can Co. and named Marasperse N-22, is prepared. Said Marasperse N-22 has the following analysis: pH (3% solution): 7.5–8.5; Total Sulfur as S: 7.3%; Sulfate Sulfur as S: 1.0%; Sulfite Sulfur as S: 0.12%; CaO: 0.55%; MgO: 0.3%; $Na_2O$: 13.2%; Reducing Sugars: 0.8%; $OCH_3$: 7.7%; Moisture Content: 7.0%, is made into 1/16 inch thick test bars. Flame tests on these bars are as follows:
  Total flame out time (Sec): 61.8
  Range of flame out time (sec): 1.2–13.0
  No. of burning drips per test bar: 1
  Rating: 92 V-2

EXAMPLE IV

In the same manner as in Example I, a composition of 100 parts of the polycarbonate and 1 part Marasperse N-22 is made into 1/16 inch thick test bars. Flame tests on these bars are as follows:
  Total flame out time (sec): 64.3
  Range of flame out time (sec): 2.3–8.8
  No. of burning drips per test bar: 1–2
  Rating: 94 V-2

In the practice of this invention, any of the aromatic polycarbonates can be employed herein. These are homopolymers and copolymers and mixtures thereof that are prepared by reacting a dihydric phenol with a carbonate precursor. Typical of some of the dihydric phenols that may be employed in the practice of this invention are bisphenol-A (2,2-bis(4-hydroxyphenyl)propane), bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxydiphenylpropane, 2,2-(3,5,3',5'-tetrabromo-4,4'-dihydroxydiphenyl)propane, (3,5'-dichloro-4,4'-dihydroxyphenyl)methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonates, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiary-butylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl-ammonium iodide, benzyltrimethyl ammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

Obviously, other materials can also be employed with the aromatic carbonate polymer of this invention and include such materials as anti-static agents, pigments, mold release agents, thermal stabilizers, ultraviolet stabilizers, reinforcing fillers and the like.

The compositions of this invention can additionally have admixed therewith a minor amount of a halogen-containing flame retardant additive, preferably in an amount of from about 0.1 to about 5 parts per one hundred parts aromatic polycarbonate. Representative but not limiting examples of a halogen-containing flame retardant additive include hexabromobenzene, hexabromodiphenyl, hexachlorodiphenyl, decabromodiphenyl, decachlorodiphenyl, decabromodiphenyl ether, decachlorodiphenyl ether, 2,2-(3,3',5,5'-tetrabromo-4,4'-dihydroxydiphenyl)propane, 2,2-(3,3',5,5'-tetrachloro-4,4'-dihydroxy-diphenyl)propane, an adduct of cyclohexane and hexachlorocyclopentadiene (chloran), etc., and mixtures thereof.

It is contemplated that the various recited flame retardant additives which are the subject of this invention may also be suitably employed in the polycarbonates in admixture with one another in various proportions such as to achieve the desired degree of flame retardancy for a particular polycarbonate resin.

Since certain changes may be made in carrying out the above process and in the composition set forth without departing from the scope of this invention, it is intended that all matters contained in the above description shall be interpreted as illustrative and not in a limiting sense.

What is claimed is:

1. A flame retardant polycarbonate composition comprising in admixture an aromatic carbonate polymer and a flame retardant additive chosen from the group consisting of alkali metal lignosulfonates, alkaline earth metal lignosulfonates, and mixtures thereof.

2. The composition of claim 1 wherein the alkali metal lignosulfonate is a sodium lignosulfonate.

3. The composition of claim 1 wherein the flame retardant additive is present in an amount of about 0.1–10 parts per hundred parts of carbonate polymer.

4. The composition of claim 1 wherein the flame retardant additive is present in an amount of about 0.5–1.0 part per hundred parts of carbonate polymer.

5. The composition of claim 1 having in admixture therewith a sufficient quantity of a drip retarding agent chosen from the group consisting of fluorinated polyolefins, fibrous glass, siloxanes and mixtures thereof to render said composition non-dripping.

6. The composition of claim 1 having in admixture therewith a halogen-containing flame retardant additive.

7. The composition of claim 1 wherein the lignosulfonates are substituted with an electron withdrawing radical which is selected form the group comprising halo-radical, nitro-radical and mixtures thereof alone or in admixture with other chemically suitable electron withdrawing radicals.

8. A flame retardant polycarbonate composition comprising in admixture an aromatic carbonate polymer and a flame retardant additive chosen from the group comprising lignin, lignosulfonates and mixtures of lignin and/or lignosulfonates together with one or more components selected from the group comprising melamine-formaldehyde, phenol-formaldehyde and urea-formaldehyde.

9. A flame retardant polycarbonate composition according to claim 8 wherein the lignosulfonate is selected from the group consisting essentially of alkali metal lignosulfonates, alkaline earth metal lignosulfonates and mixtures thereof.

10. A composition according to claim 9 wherein the alkali metal lignosulfonate is a sodium lignosulfonate.

11. The composition of claim 8 wherein the flame retardant additive is present in an amount of about 0.1 to 10 parts per hundred parts of carbonate polymer.

12. The composition of claim 8 wherein the flame retardant additive is present in an amount of about 0.5 to 1.0 part per hundred parts of carbonate polymer.

13. The composition of claim 8 having in admixture therewith a sufficient quantity of a drip retarding agent chosen from the group consisting of fluorinated polyolefins, fibrous glass, siloxanes and mixtures thereof to render said composition non-dripping.

14. The composition of claim 8 having in admixture therewith a halogen-containing flame retardant additive.

15. The composition of claim 8 wherein the lignosulfonates are substituted with an electron withdrawing radical which is selected from the group comprising halo-radical, nitro-radical and mixtures thereof alone or in admixture with other chemically suitable electron withdrawing radicals.

* * * * *